March 18, 1924.
I. SILFVENIUS
FLYING MACHINE
Filed March 5, 1923
1,486,991
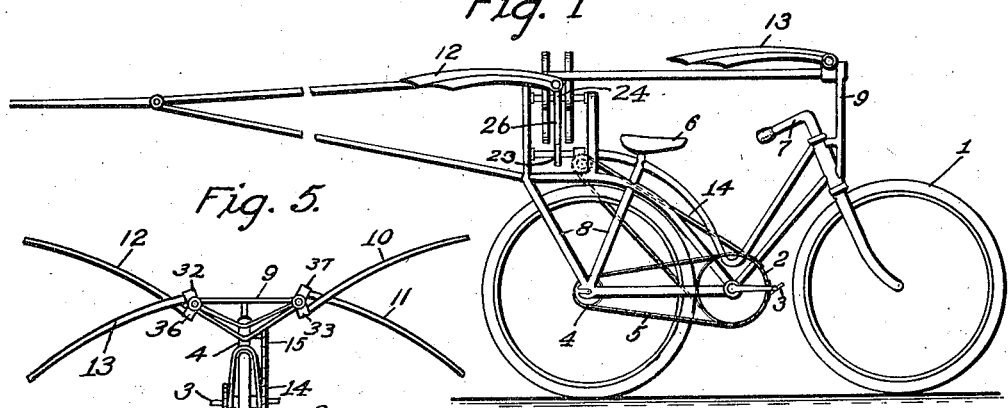
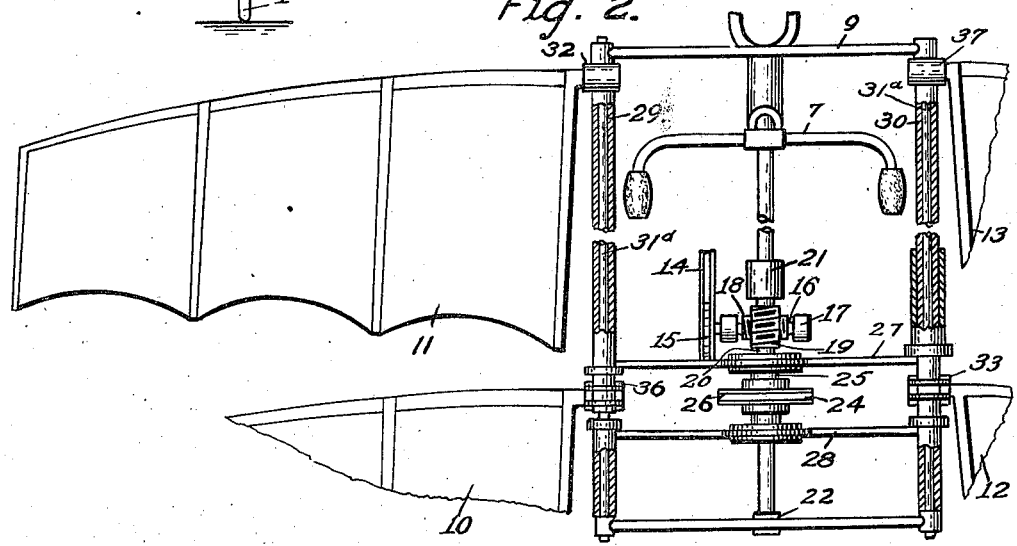
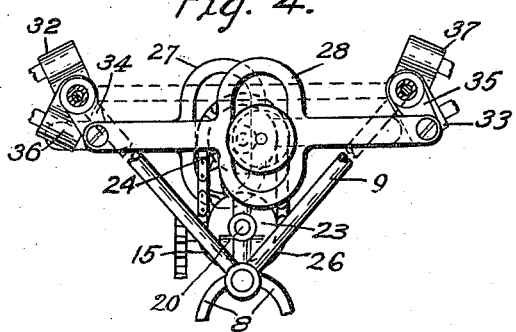
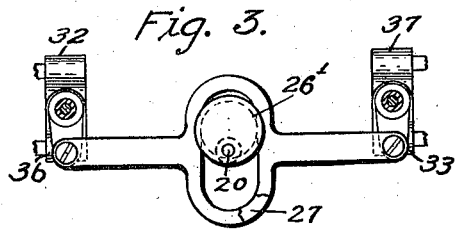
Inventor,
Ivar Silfvenius,
by John A. McManus
His Attorney.

Patented Mar. 18, 1924.

1,486,991

UNITED STATES PATENT OFFICE.

IVAR SILFVENIUS, OF LYNN, MASSACHUSETTS.

FLYING MACHINE.

Application filed March 5, 1923. Serial No. 622,904.

*To all whom it may concern:*

Be it known that I, IVAR SILFVENIUS, a citizen of the United States, residing at Lynn, in the county of Essex and State of Massachusetts, have invented certain new and useful Improvements in Flying Machines, of which the following is a specification.

The present invention relates to flying machines of the manually operated type. The object of the invention is to provide a flying machine which will be cheap to manufacture and easy to manipulate, the power for operating being developed by foot power after the manner of pedalling a bicycle.

Another object of the invention is to run the bicycle along the ground by pedalling, as with the case of an ordinary bicycle, until sufficient speed is attained for the development of flight. The principles of starting a heavier than air machine are so well known in the art that no recitation of them is deemed to be necessary.

The particular object of my invention is to provide a specific mechanism in combination with a foot pedalled motive power source which will enable the vehicle to be flown by actuating suitable wings to be respectively raised and depressed in alternate relation to each other to produce flight through the air, similar to the action of a dragon-fly.

My invention will be more clearly understood by referring more specifically to the accompanying specification and drawing, wherein Fig. 1 represents a side elevation of my improved flying machine; Fig. 2 represents a plan view in partial section and partly broken away; Fig. 3 is a view of the wing actuating mechanism taken on line 3—3 of Fig. 3; Fig. 4 is a rear view of the superstructure 9 showing the arrangement of the yoke strap and supports, and Fig. 5 is a front elevation showing the front supporting structure and the wings spread in the relation shown in Fig. 4.

Referring more specifically to Fig. 1, 1 represents a bicycle of quite usual construction, the large sprocket wheel thereof being represented by 2 and the pedals by 3. The small sprocket is represented by 4, and the chain for operating the bicycle (and therefore the flying machine as a whole) while on the ground, is represented by 5. The operator's seat is shown at 6, and the steering handle bars at 7. Integral therewith or otherwise attached to the bicycle frame 8 is a superstructure 9 which supports the wings 10, 11, 12 and 13 and their operating mechanism. A chain 14 drives a small sprocket or pinion 15, the latter being mounted on a shaft 16 which is supported in a bearing 17. Upon the shaft 16 which carries the pinion 15 is mounted a 45° worm gear 18 and which meshes with a worm 19 mounted on a shaft 20 mounted in supports 21, 22. Upon the shaft 20 is also mounted a driving gear 23 which drives gear 24 on the crank shaft 25 by means of a chain 26. The crank shaft 25 is attached to eccentric blocks one of which is shown at 26' extending through suitable yoke straps 27 and 28. Parallel frame members 29 and 30 upon which the wing supports are mounted are provided. The member 30 has an internal member 31$^a$ which extends through the sleeve member 30 the entire length of the frame. The various movable shafts referred to and the movable frame members 29, 30 and 31$^a$ are provided with suitable ball bearings to minimize friction. In order that the flying machine may similate the action of a dragon fly in motion, it is required that forward wing 11, for example, shall be actuated to have motion simultaneously with the rear wing 12. In order to accomplish this, both of these wings are connected by means of the yoke strap 27, which is actuated by the crank shaft 25. The wing 11 is mounted in a pintle 32, and the wing 12 in a pintle 33. The pintle 32 is in turn mounted on the frame member 29 and the pintle 33 on the inner member 31$^a$ of the frame. The yoke strap 27 is connected to the frame members which actuate these pintles by means of short links 34 and 35 respectively. Thus when the yoke strap 27 is actuated by means of the crank shaft 25, the frame member 29 and the frame member 31$^a$ are oscillated through a sufficient range and in such manner that the wing 11 and the wing 12 are respectively raised or depressed, or vice versa, simultaneously. The rear wing 10 and the forward wing 13 are simultaneously actuated by means of the yoke strap 28, the pintles 36 and 37 being mounted in such manner that the wing 10 and wing 13 are actuated to be raised and depressed simultaneously by means of the yoke strap 28. Fig. 5 shows the respective relation of the wings with each other. Wing 11, for example, is down while wing 12 is up, this being accomplished, as is heretofore stated, by means of a peculiar connection of the two wings through the yoke strap 27 and the specific arrangement of the frame members and pintles as previously described. The flap of the wings accomplished by the arrangement of the mechanism is 60°.

Referring to the large sprockets for driving both the bicycle while on the ground and the actuating mechanism for the crank to give motion to the wings, this may be a double sprocket, as is shown with the sprocket partially broken away in Fig. 1.

The balancing of the machine while in flight is accomplished by the twisting of the tail, but the method and means for performing these functions are so well known that they will not be mentioned here, the object being to confine the invention to specific improvements, such as the combination of the bicycle driven means and the particular mechanism in combination therewith for actuating the wing members.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:

1. In a flying machine, the combination of a bicycle, an operator's seat therefor, a superstructure mounted on said bicycle, two pairs of flying wings journalled in said superstructure, a link connection between the forward wing on one side to the rear wing on the other in a manner to raise one while the other is depressed, a second link motion for the other pair of alternate wings which actuates them in like manner to the first mentioned pair, and a common pedal actuated means for operating both the bicycle and the links.

2. In a flying machine, the combination of a bicycle, an operator's seat therefor, a superstructure mounted on said bicycle, two pairs of flying wings journalled in said superstructure, a link connection between the forward wing on one side to the rear wing on the other in a manner to raise one while the other is depressed, a second link motion for the other pair of alternate wings which actuates them in like manner to the first mentioned pair, a common pedal actuated means for operating both the bicycle and the links, a pair of sprocket wheels and a chain therefor for operating the bicycle, a second pair of sprocket wheels also provided with a chain for actuating the link mechanism for the wings, both pairs of sprockets and chains being driven by means of the common pedal actuated means.

3. In a flying machine, the combination of a bicycle, an operator's seat therefor, a frame attached to said bicycle and carrying flying wings above the latter, links comprised of yoke strap connections actuated by a common crank shaft the said connections linking the forward wing on one side of the machine with the rear wing on the opposite side in a manner to raise one wing and depress the other simultaneously, a pair of pedals for the bicycle, suitable sprockets and chain for actuating the bicycle, a second pair of sprockets and chain for actuating the crank, and suitable worm gears and driving gear and chain for the purpose of driving the crank shaft.

4. In a flying machine, the combination of a bicycle, an operator's seat therefor, a frame mounted on said bicycle comprised of two parallel members, sleeves on the parallel members, wing connections on the sleeves, yoke straps connecting the alternate forward and rear wings on opposite sides of the machine to act to be raised and lowered respectively, and a pedal actuating means for operating both the bicycle and yoke straps.

IVAR SILFVENIUS.